US012067345B2

(12) United States Patent
Wan et al.

(10) Patent No.: US 12,067,345 B2
(45) Date of Patent: Aug. 20, 2024

(54) TABLE DISPLAYING METHOD, DEVICE AND MEDIUM

(71) Applicant: Beijing Zitiao Network Technology Co., Ltd., Beijing (CN)

(72) Inventors: Shiqi Wan, Beijing (CN); Hongxiao Xin, Beijing (CN)

(73) Assignee: Beijing Zitiao Network Technology Co., Ltd. (CN)

( * ) Notice: Subject to any disclaimer, the term of this patent is extended or adjusted under 35 U.S.C. 154(b) by 0 days.

(21) Appl. No.: 18/490,391

(22) Filed: Oct. 19, 2023

(65) Prior Publication Data
US 2024/0046025 A1 Feb. 8, 2024

Related U.S. Application Data

(63) Continuation of application No. PCT/CN2022/089776, filed on Apr. 28, 2022.

(30) Foreign Application Priority Data

May 10, 2021 (CN) .......................... 202110507031.6

(51) Int. Cl.
| | | |
|---|---|---|
| G06F 3/0485 | (2022.01) | |
| G06F 3/0482 | (2013.01) | |
| G06F 3/0483 | (2013.01) | |
| G06F 3/0488 | (2022.01) | |
| G06F 40/106 | (2020.01) | |

(52) U.S. Cl.
CPC .......... *G06F 40/106* (2020.01); *G06F 3/0482* (2013.01); *G06F 3/0483* (2013.01); *G06F 3/0488* (2013.01); *G06F 2203/04806* (2013.01)

(58) Field of Classification Search
CPC ................................................ G06F 3/048–05
See application file for complete search history.

(56) References Cited

U.S. PATENT DOCUMENTS

| | | | | |
|---|---|---|---|---|
| 5,347,295 A | * | 9/1994 | Agulnick .............. | G06F 1/1643 715/863 |
| 5,995,984 A | * | 11/1999 | Lau ........................ | G06F 3/0481 715/219 |
| 7,793,217 B1 | * | 9/2010 | Kim ........................ | G16H 80/00 715/255 |
| 8,010,702 B2 | * | 8/2011 | Farouk .................. | H04L 67/565 709/217 |

(Continued)

FOREIGN PATENT DOCUMENTS

| | | |
|---|---|---|
| CN | 101359322 A | 2/2009 |
| CN | 101441656 A | 5/2009 |

(Continued)

OTHER PUBLICATIONS

International Search Report issued Jul. 15, 2022 for PCT Application No. PCT/CN2022/089776, English translation (7 pages).

*Primary Examiner* — Daniel Rodriguez

(57) ABSTRACT

The embodiments of the display disclosure relate to a table displaying method, device, and medium, wherein the method includes: determining a displaying mode of a table on a current interface; and in response to a browse triggering operation on the table, displaying table information matched with a displaying size of the current interface according to the displaying mode.

19 Claims, 12 Drawing Sheets

(56) References Cited

U.S. PATENT DOCUMENTS

| | | | |
|---|---|---|---|
| 10,956,651 B1* | 3/2021 | Leem | G06F 3/04842 |
| 11,237,849 B2* | 2/2022 | Leong | G06F 16/63 |
| 2006/0168506 A1 | 7/2006 | Endo et al. | |
| 2006/0236233 A1* | 10/2006 | Ozawa | H04N 21/44224 |
| | | | 715/234 |
| 2008/0082938 A1* | 4/2008 | Buczek | G06F 40/18 |
| | | | 715/227 |
| 2009/0207184 A1* | 8/2009 | Laine | H04N 21/41265 |
| | | | 725/39 |
| 2010/0269031 A1* | 10/2010 | Buczek | G06F 40/18 |
| | | | 715/217 |
| 2012/0180002 A1* | 7/2012 | Campbell | G06F 3/0485 |
| | | | 715/863 |
| 2014/0033093 A1 | 1/2014 | Brauninger et al. | |
| 2014/0359496 A1* | 12/2014 | Cammarata | G06F 9/451 |
| | | | 715/763 |
| 2015/0169531 A1* | 6/2015 | Campbell | G06F 3/0488 |
| | | | 715/212 |
| 2016/0011766 A1* | 1/2016 | Kosaka | G06F 3/0488 |
| | | | 715/787 |
| 2016/0078005 A1* | 3/2016 | Soós | G06F 40/114 |
| | | | 715/251 |
| 2016/0209987 A1* | 7/2016 | Kaufthal | G06F 3/0481 |
| 2017/0124055 A1* | 5/2017 | Radakovitz | G06F 3/0488 |
| 2019/0362009 A1* | 11/2019 | Miseldine | G06F 16/285 |
| 2020/0285321 A1* | 9/2020 | Ma | G06F 3/017 |
| 2023/0325580 A1* | 10/2023 | Zhang | G06F 3/0483 |

FOREIGN PATENT DOCUMENTS

| | | |
|---|---|---|
| CN | 104516867 A | 4/2015 |
| CN | 104571862 A | 4/2015 |
| CN | 107016067 A | 8/2017 |
| CN | 108037974 A | 5/2018 |
| CN | 108446152 A | 8/2018 |
| CN | 109271618 A | 1/2019 |
| CN | 109670157 A | 4/2019 |
| CN | 111950241 A | 11/2020 |
| CN | 112286603 A | 1/2021 |

* cited by examiner

```
┌─────────────────────────────────┐
│   when the displaying mode is a second  │
│  displaying mode, in response to a swipe │
│       browse operation on the table,     │──── 501
│   continuously displaying an index field │
│       name in the table on a first       │
│       association area of the current    │
│                 interface                 │
└─────────────────────────────────┘
                  │
                  ▼
┌─────────────────────────────────┐──── 502
│   in association with a swipe direction  │
│      of the swipe browse operation,      │
│      continuously displaying table       │
│  information matched with the displaying │
│    size and corresponding to the index   │
│    field on a second association area of │
│     the current interface in a sliding   │
│                  manner                   │
└─────────────────────────────────┘
```

Fig. 5

TABLE DISPLAYING METHOD, DEVICE AND MEDIUM

CROSS-REFERENCE TO RELATED APPLICATIONS

The present disclosure is a U.S. National Stage Application under 35 U.S.C. § 371 of International Patent Application No. PCT/CN2022/089776, filed on Apr. 28, 2022, which is based on and claims the priority to the Chinese patent application No. 202110507031.6 filed on May 10, 2021, the disclosure of both of which are hereby incorporated by reference in its entirety into the present application.

TECHNICAL FIELD

The present disclosure relates to the technical field of data front-end processing, and in particular, to a table displaying method, apparatus, device, and medium.

BACKGROUND

With the development of computer technology, online production life has become pervasive, and thus, tables for storing online data have become increasingly common, wherein, relations between data and objects are usually stored in the tables, generally consisting of vertical columns and horizontal rows; for example, in one "name" table related to author information, each column contains a specific type of information of all authors, such as "last name", and each row contains all information of a specific author: last name, first name, address, etc.

SUMMARY

The present disclosure provides a table displaying method, apparatus, device, and medium.

Some embodiments of the present disclosure provide a table displaying method, comprising: determining a displaying mode of a table on a current interface; and in response to a browse triggering operation on the table, displaying table information matched with a displaying size of the current interface according to the displaying mode.

Some embodiments of the present disclosure further provide a table displaying apparatus, comprising:
  a determination module configured to determine a displaying mode of a table on a current interface; and a display module configured to, in response to a browse triggering operation on the table, display table information matched with a displaying size of the current interface according to the displaying mode.

Some embodiments of the present disclosure further provide an electronic device, comprising: a processor; and a memory configured to store instructions executable for the processor, the processor being configured to read the executable instructions from the memory and execute the instructions to implement the table displaying method according to the embodiments of the present disclosure.

Some embodiments of the present disclosure further provide a non-transitory computer-readable storage medium having a computer program stored thereon, the computer program being used for performing the table displaying method according to the embodiments of the present disclosure.

Some embodiments of the present disclosure further provide a computer program, comprising: instructions which, when executed by a processor, cause the processor to perform the table displaying method according to the embodiments of the present disclosure.

Some embodiments of the present disclosure further provide a computer program product, comprising instructions which, when executed by a processor, cause the processor to perform the table displaying method according to the embodiments of the present disclosure.

BRIEF DESCRIPTION OF THE DRAWINGS

The above and other features, advantages, and aspects of the embodiments of the present disclosure will become more apparent in conjunction with the accompanying drawings and with reference to the following DETAILED DESCRIPTION. Throughout the drawings, identical or similar reference numbers refer to identical or similar elements. It should be understood that the drawings are schematic and that components and elements are not necessarily drawn to scale.

FIG. 5 is a schematic flow diagram of another table displaying method provided in some embodiments of the present disclosure;

DETAILED DESCRIPTION

Figure 1:
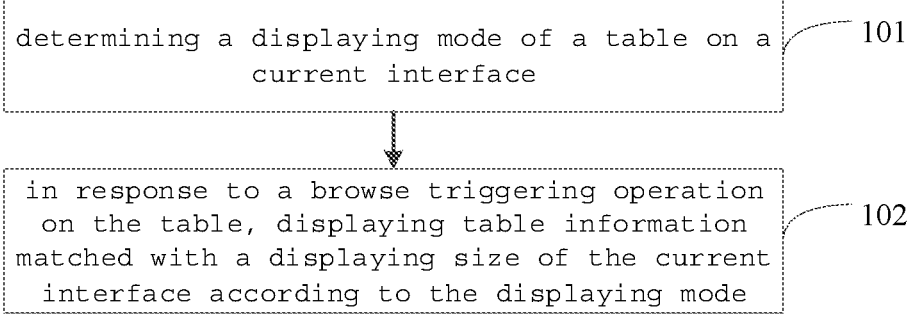
FIG. 1 is a schematic flow diagram of a table displaying method provided in some embodiments of the present disclosure.

The embodiments of the present disclosure will be described in more detail below with reference to the accompanying drawings. While certain embodiments of the present disclosure are shown in the drawings, it should be understood that the present disclosure may be implemented in various forms and should not be construed as limited to the embodiments set forth herein, and rather, these embodiments are provided for a more complete and thorough understanding of the present disclosure. It should be understood that the drawings and the embodiments of the present disclosure are for exemplary purposes only and are not intended to limit the scope of protection of the present disclosure.

It should be understood that various steps recited in method implementations of the present disclosure may be performed in a different order, and/or performed in parallel. Moreover, the method implementations may include additional steps and/or omit performing the illustrated steps. The scope of the present disclosure is not limited in this respect.

The term "comprising" and variations thereof that are used herein are intended to be open-ended, i.e., "comprising but not limited to". The term "based on" is "at least partially based on". The term "one embodiment" means "at least one embodiment"; the term "another embodiment" means "at least one other embodiment"; the term "some embodiments" means "at least some embodiments". Relevant definitions for other terms will be given in the following description.

It should be noted that the concepts of "first", "second", and the like mentioned in the present disclosure are only used for distinguishing different devices, modules or units, and are not used for limiting order or interdependence of functions performed by the devices, modules or units.

It should be noted that the modifications of "one" or "plurality" mentioned in the present disclosure are illustrative rather than restrictive, and those skilled in the art should appreciate that they should be understood as "one or more" unless otherwise clearly indicated in the context.

Names of messages or information exchanged between a plurality of devices in the embodiments of the present disclosure are for illustrative purposes only, and are not intended to limit the scope of the messages or information.

In the related art, to view a table, the whole table is exported as a picture onto a terminal device, and a user views data by dragging the picture.

However, in the above manner of viewing the table depending on the manual drag by the user, the user needs to drag the picture of the table towards a corresponding direction for viewing, according to a viewing requirement, and when the table is large, the picture of the table needs to be continually zoomed in or out for viewing, resulting in inconvenience in the viewing of the table.

In order to solve the above problem of inconvenience in the viewing of the table, in some embodiments of the present disclosure, a displaying method of a table with high readability is provided, in which on one hand, the table is displayed in combination with a displaying mode, rather than only depending on the manual drag by the user, so that flexibility of the table displaying is ensured, and on the other hand, the displaying is made adaptively according to a displaying size of a current interface, without the need for the user to manually zoom in or out the table for viewing, so that readability of the table is improved.

The current interface described above may be located on any terminal device, which includes but is not limited to, a mobile phone with a display screen, a notebook computer, a wearable device, and the like, and the table described above may be a traditional database table, and may also be any other data information displayed in a form of a table, for example, although some data information does not originate from a database, it is displayed in a form of a table when displayed, then the data information also belongs to the table in some embodiments.

The table displaying method is described below in conjunction with specific embodiments.

FIG. 1 is a schematic flow diagram of a table displaying method provided in some embodiments of the present disclosure. The method may be executed by a table displaying apparatus, wherein the apparatus may be implemented by software and/or hardware, and may be generally integrated in an electronic device. As shown in FIG. 1, the method comprises:

step 101, determining a displaying mode of a table on a current interface.

The displaying mode in some embodiments is used for limiting displaying content (including but not limited to an index field of the table, data in a cell in the table, and the like), a displaying format (including but not limited to one or more of a displaying position, a displaying animation, and a displaying font size of the displaying content), and the like of the table on the current interface.

In some embodiments, the displaying mode of the table on the current interface is determined so as to further determine specific content of the table displayed on the current interface according to the displaying mode.

It should be noted that, in different application scenarios, there are different manners of determining the displaying mode of the table at a mobile terminal. In some possible embodiments, a displaying mode set by system default is received, that is, in some embodiments, the displaying mode is set by system default; and in other possible embodiments, a candidate displaying mode list may be preset, which may include a plurality of displaying modes, so that a displaying mode selected by the user from the candidate displaying mode list is received as the displaying mode of the table at the mobile terminal.

In still other possible embodiments, a switching sequence of different displaying modes is preset, and in response to a switching operation on a current displaying mode, a displaying mode after the switching is determined, that is, if a user performs the switching operation once, the displaying mode is switched to a next displaying mode of the current displaying mode; for example, it is determined that a displaying mode 1, a displaying mode 2, and a displaying mode 3 are sequentially switched, then if a current displaying mode is the displaying mode 1, and the user performs the switching operation once, it is determined that the displaying mode 2 is a displaying mode of the table at the mobile terminal.

Step 102, in response to a browse triggering operation on the table, displaying table information matched with a displaying size of the current interface according to the displaying mode.

In some embodiments, in response to the browse triggering operation on the table, the browse triggering operation may be, on the current interface, implemented by the user through a trigger trajectory on the table, or implemented by the user through speech, or implemented by the user through trigger of a preset browse control for the table, which is not listed one by one here.

Therefore, in some embodiments, in response to the browse triggering operation on the table, the table information is displayed according to the displaying mode, and as mentioned above, the displaying mode decides the displaying content and the displaying format and the like of the table, so that the intuitive displaying content of the table can be flexibly decided based on the displaying mode.

Moreover, in order to avoid an excessive size of the table information that results in limited display of the table information, or a small size of the table information that results in the user being hard to clearly know the table information, in some embodiments, the table information is also matched according to the displaying size of the current interface. Therefore, the table information is displayed in combination with the displaying mode and the displaying size of the current interface, which intuitively gives the user a feeling that the table information is in a very good fit with the current interface.

Figure 2:
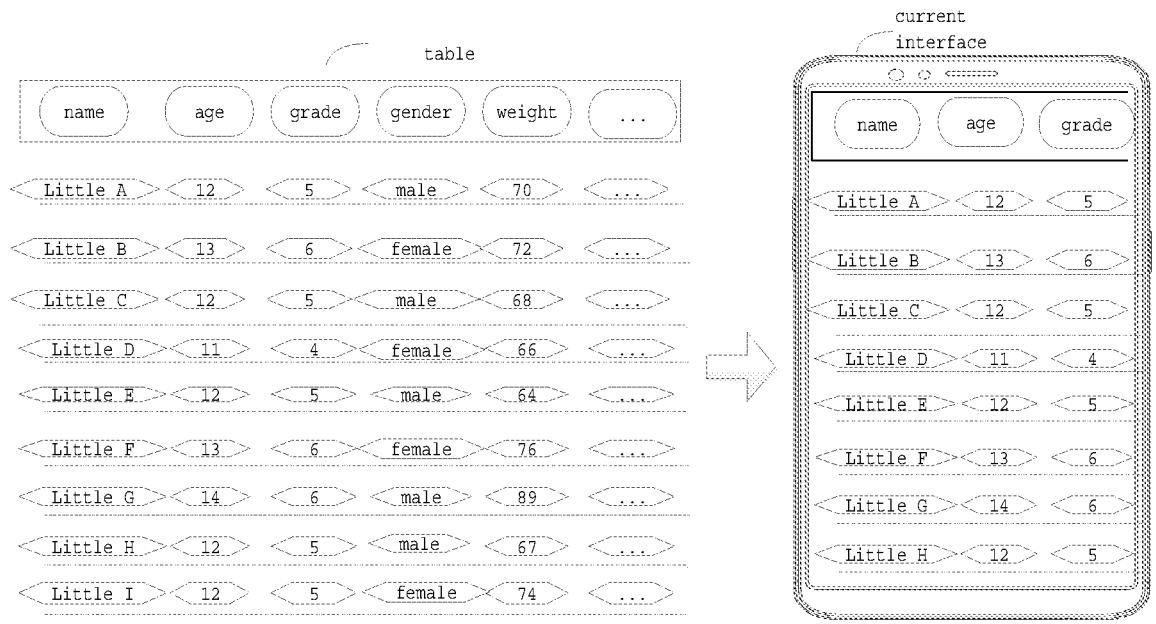
FIG. 2 is a schematic diagram of a current interface for table information displaying provided in some embodiments of the present disclosure.

For example, when the displaying mode includes a default displaying row height and column width of the table, a row position and a column position (for the sake of smoothness of the displaying, as shown in FIG. 2, row and column herein may not be integers, that is, a partial area of a certain row or a partial area of a certain column may be displayed according to the displaying size, etc.) of the displayed table are determined based on a length and a width of the displaying size.

In some possible embodiments, the displaying size may be a landscape-screen size or a portrait-screen size, that is, in some embodiments, table information matched with a landscape-screen viewing size of the current interface may be displayed according to the displaying mode, or table information matched with a portrait-screen viewing size of the current interface may be displayed according to the displaying mode.

Figure 3A:
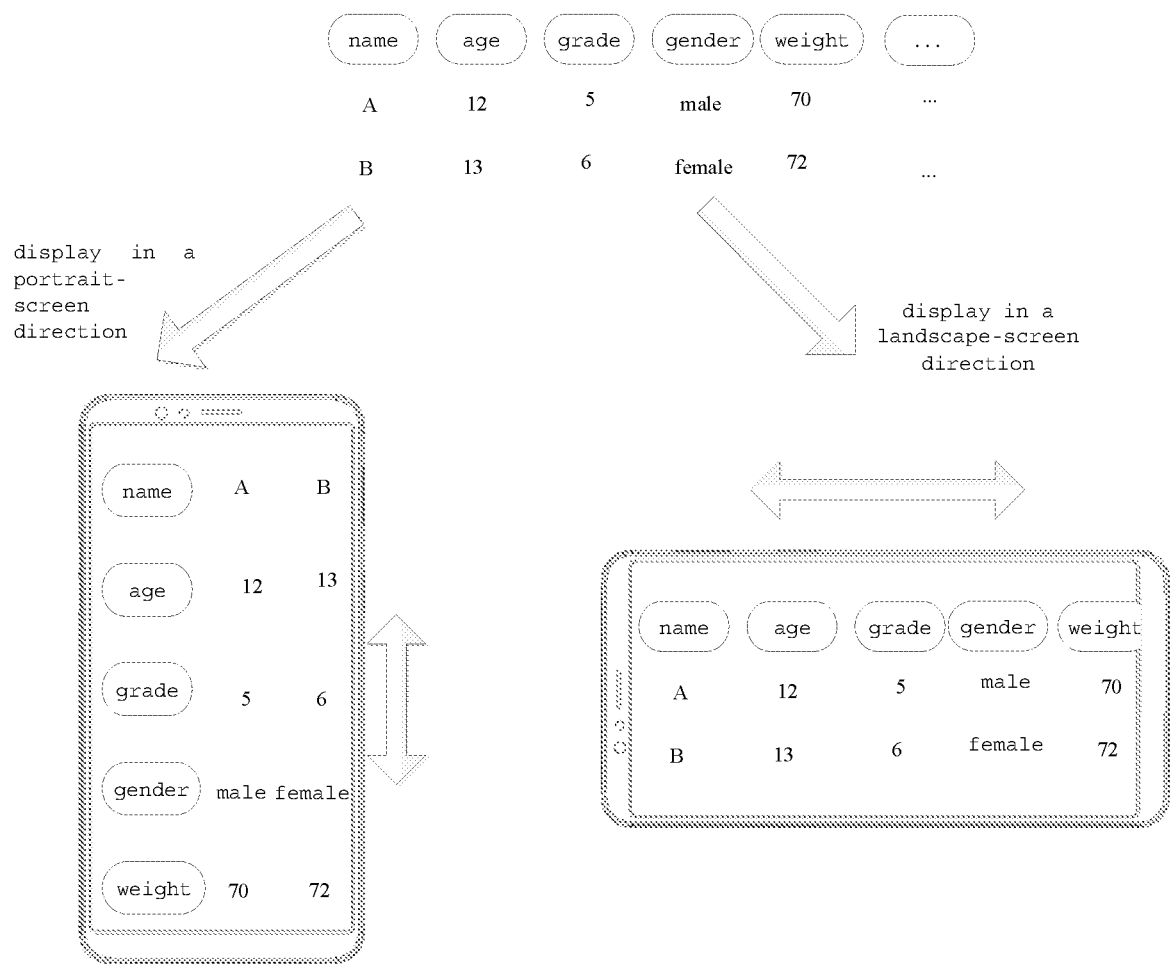
FIG. 3(a) is a schematic diagram of another current interface for table information displaying provided in some embodiments of the present disclosure.
Figure 3:
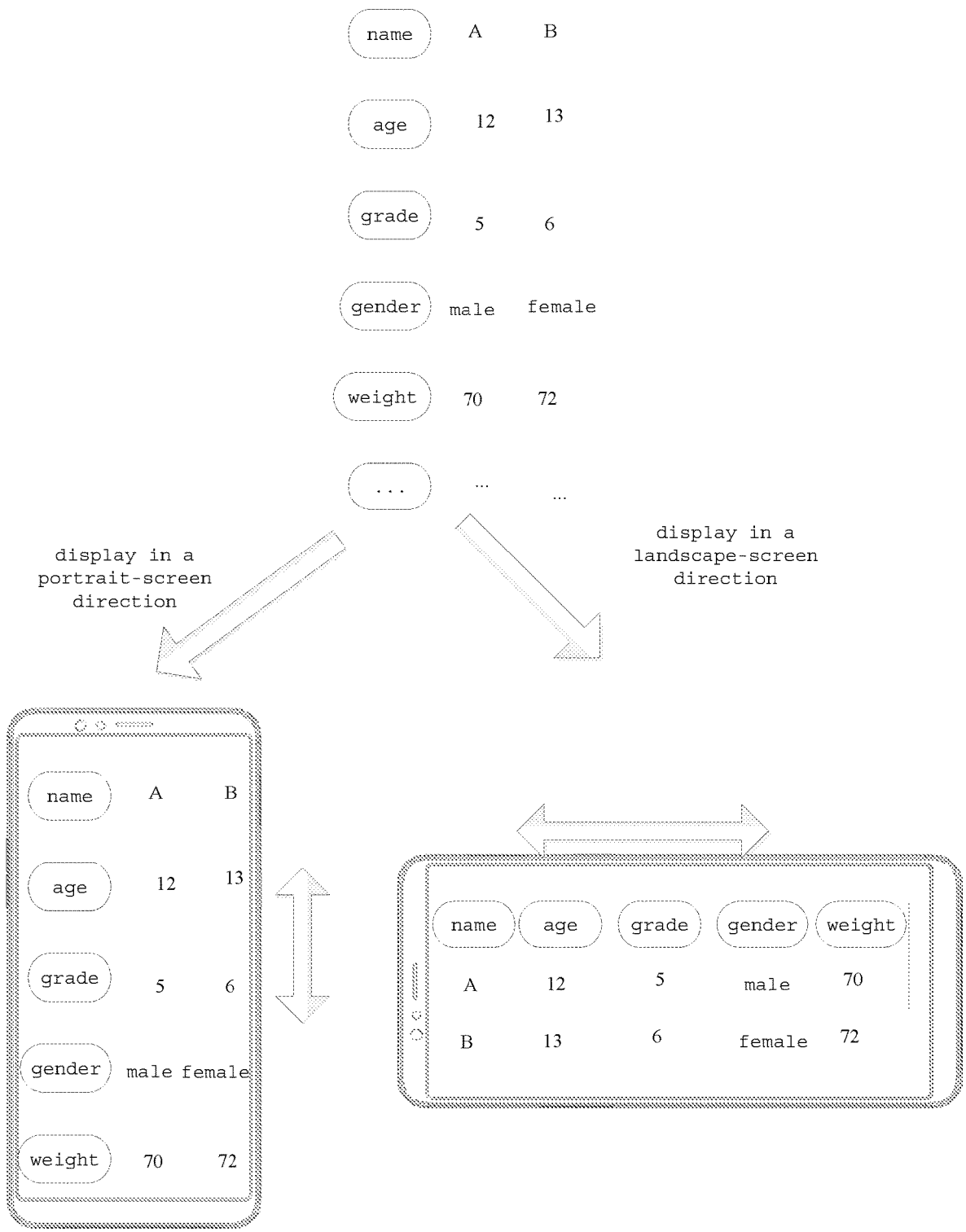
FIG. 3(b) is a schematic diagram of another current interface for table information displaying provided in some embodiments of the present disclosure.

In some embodiments, if the table has more rows and fewer columns, as shown in FIG. 3 (a), in the case of the landscape-screen viewing size, the rows of the table are controlled to be switch-displayed in a landscape-screen direction, and in the case of the portrait-screen viewing size, contents corresponding to the rows of the table are controlled to be switch-displayed in a portrait-screen direction.

On the contrary, if the table has fewer rows and more columns, as shown in FIG. 3 (b), in the case of the landscape-screen viewing size, the columns of the table are controlled to be switch-displayed in a landscape-screen direction, and in the case of the portrait-screen viewing size, the columns of the table are controlled to be switch-displayed in a portrait-screen direction. In summary, the table displaying method according to the embodiments of the display disclosure, determines the displaying mode of the table on the current interface, and then, in response to the browse triggering operation on the table, displays the table information matched with the displaying size of the current interface according to the displaying mode. Therefore, the content of the table is displayed adaptively according to the displaying size and the displaying mode of the mobile terminal, so that readability of the table is improved, and convenience is provided for viewing the content in the table.

The table information in the embodiments of the display disclosure is displayed based on the displaying mode, which, intuitively, through the displaying mode, automatically adaptively splits and displays the table information in the table, without the need for the user to manually drag the table for the viewing of the table information, breaks the traditional displaying mode of the table information, and improves readability of the table.

In order to enable those skilled in the art to have a clearer understanding of how the table in the embodiments of the display disclosure is displayed through the displaying mode, the description thereof is made below respectively in combination with different displaying mode examples:

In this example, the displaying mode is a first displaying mode.

In some embodiments, in response to a swipe browse operation on a table, in association with a swipe direction of the swipe browse operation, continuous swipe is performed on the current interface to display the table information matched with the displaying size. The swipe browse operation may be a leftward/rightward swipe browse operation, and at this point, the swipe direction of the swipe browse operation is a leftward/rightward direction; or, the swipe browse operation may be a upward/downward swipe browse operation, and at this point, the swipe direction of the swipe browse operation is a upward/downward direction, and so on; of course, the swipe direction of the swipe browse operation may also be other directions, such as leftward downward and leftward upward directions, which will not be listed one by one here.

It can be understood that, in some embodiments, the table information of the table on the current interface, such as field names and specific cell contents, is displayed in a form of a list, and when the table information is exhibited in the form of the list, free switching between the contents can be performed according to the swipe browse operation.

Figure 4A:
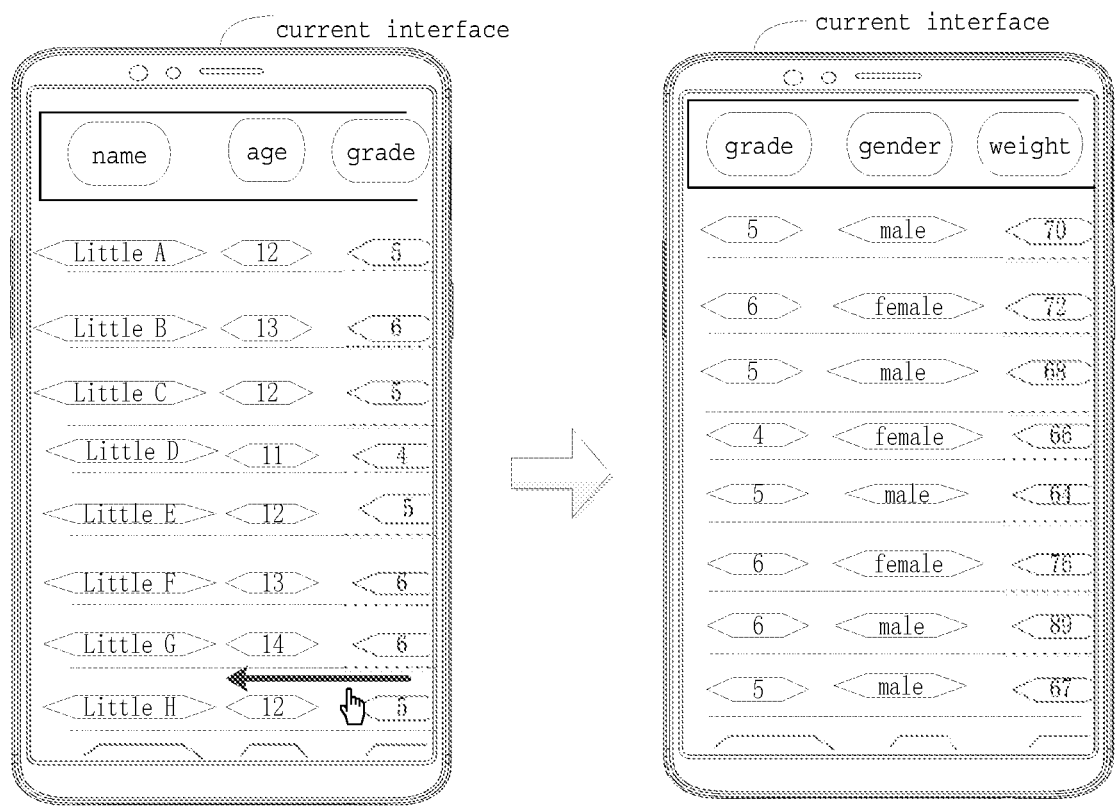
FIG. 4(a) is a schematic diagram of another current interface for table information displaying provided in some embodiments of the present disclosure.

For example, as shown in FIG. 4(a), when the displaying mode is the first displaying mode, in response to a right-to-left swipe browse operation on the table, the table is switched from right to left for display, thereby intuitively giving the user a feeling of smooth switching.

Of course, in this example, the switching for display of the table information in the first displaying mode may also be triggered by a control.

In this example, when the displaying mode is the first displaying mode, in response to a triggering operation on a browse control for the table, the browse control for the table may be integrated on a hardware control for a volume etc. of the mobile terminal, or may be a virtual control displayed on the current interface.

In some embodiments, in association with a forward/backward page-turning direction of the triggering operation, for example, in association with forward page-turning for a double-click operation on the browse control, in association with backward page-turning for a long-press operation on the browse control, and the like, page-turning is performed on the current interface to continuously display the table information matched with the displaying size, which intuitively gives the user a feeling of displaying the table information by page-turning; the user has similar feelings when viewing the table and when reading online content such as an e-book, so that the viewing is convenient.

Figure 4B:
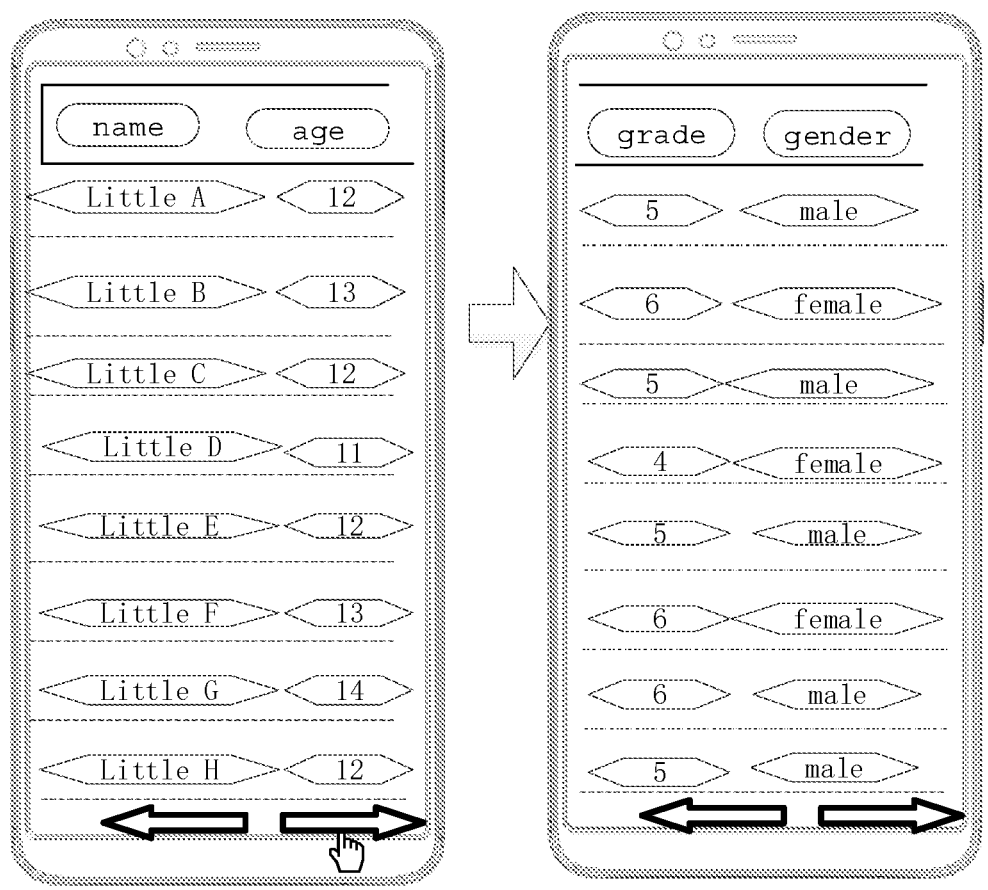
FIG. 4(b) is a schematic diagram of another current interface for table information displaying provided in some embodiments of the present disclosure.

For example, as shown in FIG. 4(b), when the browse control is "previous page" and "next page" virtual controls displayed on the current interface, if the user taps "next page", backward page-turning is performed on the current interface to display the table information matched with the displaying size.

In this example, the displaying mode is a second displaying mode.

In this example, as shown in FIG. 5, in response to a browse triggering operation on the table, displaying table information matched with a displaying size of the current interface according to the displaying mode comprises:

step 501, when the displaying mode is the second displaying mode, in response to a swipe browse operation on the table, continuously display an index field in the table on a first association area of the current interface.

The swipe browse operation may be a leftward/rightward swipe browse operation, and at this point, a swipe direction of the swipe browse operation is a leftward/rightward direction, or may be an upward/downward swipe browse operation, and at this point, a swipe direction of the swipe browse operation is an upward/downward direction, etc.; of course, the swipe direction of the swipe browse operation may also be other directions, such as leftward downward and leftward upward directions, which will not be listed one by one here.

In some embodiments, it is considered that in many scenarios, when the table is large, while content of a cell where a non-index field is located is displayed, it is difficult for the user to know which index field the content of the currently viewed cell corresponds to; for example, when an index field includes a user name, when the user views to table information of a current interface that does not include an index field where the user name is located, the user cannot know to which user the current table information corresponds; therefore, in order to further increase readability of the table, in some embodiments, the index field in the table is continuously displayed on the first association area of the current interface, so that regardless of which cells the table information corresponds to, the user can, on the current interface, clearly know the index field corresponding to the cell content.

The above first association area may be any blank area of an area where the table information corresponding to the index field is located, or a background area of the area where the table information corresponding to the index field is located, or the like, which is not limited here.

Step 502, in association with the swipe direction of the swipe browse operation, swiping on a second association area of the current interface to continuously display table information matched with the displaying size and corresponding to the index field.

In some embodiments in association with the swipe direction of the swipe browse operation, it is swiping on the second association area of the current interface to continuously display the table information matched with the displaying size and corresponding to the index field, that is, the second association area may be understood as a display area of the table information in the cell corresponding to the index field on the current interface, so that it is ensured that the index field is always displayed on the first association area when the table information is switched. For example, as shown in FIG. 6(*a*), when the displaying mode is the second displaying mode, the index field is a user name, and the first association area is any blank area on an area where table information corresponding to the index field is located, in response to a right-to-left swipe browse operation on the table, table information of the table is switched from right to left for display on the second association area, and the index field is always displayed on the first association area, so that no matter which cell the table information corresponds to, the index field to which the table information belongs can be known on the current interface.

Similarly, in this example, the switching for display of the table information in the second displaying mode may also be triggered by a control.

In this example, when the displaying mode is the second displaying mode, in response to a triggering operation on a browse control for the table, an index field in the table is continuously displayed on the first association area of the current interface, wherein the browse control for the table may be integrated on a hardware control for a volume etc. of the mobile terminal, or may be a virtual control displayed on the current interface.

Further, in association with a forward/backward page-turning direction of the triggering operation, for example, in association with forward page-turning for a double-click operation on the browse control, in association with backward page-turning for a long-press operation on the browse control, and the like, page-turning is performed on the second association area of the current interface to continuously display the table information matched with the displaying size and corresponding to the index field. Therefore, it is ensured that, upon page-turning for displaying the table information, the index field "name" is always displayed in the first association area.

For example, as shown in FIG. 6(*b*), when the browse control is "previous page" and "next page" virtual controls displayed on the current interface, the displaying mode is the second displaying mode, the index field is a user name, and the first association area is any blank area on an area where table information corresponding to the index field is located, if the user taps "next page", backward page-turning is performed on a second association area on the current interface to display the table information matched with the displaying size, and the index field is displayed on the first association area, so that no matter which cell the table information corresponds to, the index field to which the table information belongs can be known on the current interface.

Based on the above description, in order to further improve readability of the table, the display mode may also be processed for the first association area and the second association area, which is exemplified as follows.

In some embodiments of the present disclosure, while continuously displaying the index field in the table on the first association area of the current interface, the index field may be continuously displayed fixedly on the first association area, and in order to make the display more interested, the index field may be continuously displayed flickeringly on the first association area.

In some embodiments of the present disclosure, the information displayed on the first association area and the second association area may be zoomed in in a form of card, so that the user can more intuitively know the table information.

In some embodiments of the present disclosure, matched information displayed on the first association area and the second association area is displayed in a manner of up-and-down adjacency, for example, as shown in FIG. 6(*b*), the first association area is located above the second association area, or matched information displayed on the first association area and the second association area is displayed in a manner of left-and-right adjacency, for example, as shown in FIG. 6(*c*), when the table is displayed according to a portrait-screen size, matched information displayed on the first association area and the second association area is displayed in the manner of left-and-right adjacency.

It should be emphasized that, in a practical application, the index field of the table comprises a first index field and a second index field, wherein the first index field may be understood as the index field described in the above embodiment, i.e., a field that may uniquely locate an object to which the table information belongs, such as the "name" index field in FIG. 6(*a*), and the second index field may be understood as a field for distinguishing to which attribute of an object a plurality of pieces of table information under each first index field respectively points, for example, when the first index field is "name", the corresponding second index field may be "age", "height", "gender", and the like.

In some embodiments, in order to further improve readability of the table, the first index field is displayed on the first association area, and in association with the browse triggering operation (the browse triggering operation includes the triggering operation on the browse control or the swipe browse operation, etc.) on the table, the second index field matched with the displaying size is variably displayed on a third association area of the current interface, thereby intuitively indicating which attribute each piece of table information corresponds to, wherein the third association area may be an association area in a row or a column where table information corresponding to one same attribute is located, for example, a blank area in the row or column, or a first cell area in the row or column where corresponding table information is located, etc. In some embodiments, in order to intuitively indicate which attribute each piece of table information corresponds to, the table information corresponding to the first index field and the second index field is changingly displayed on the second association area, in linkage with the third association area.

In some embodiments of the present disclosure, the first association area and the second association area will be adjusted accordingly based on a quantity of table data. The first association area may be an area corresponding to first index fields of all data rows, or an area corresponding to a single first index field of any data row; and the second association area may be an area corresponding to table information of all data rows, or an area corresponding to a certain piece of table information of any data row.

Figure 6A:
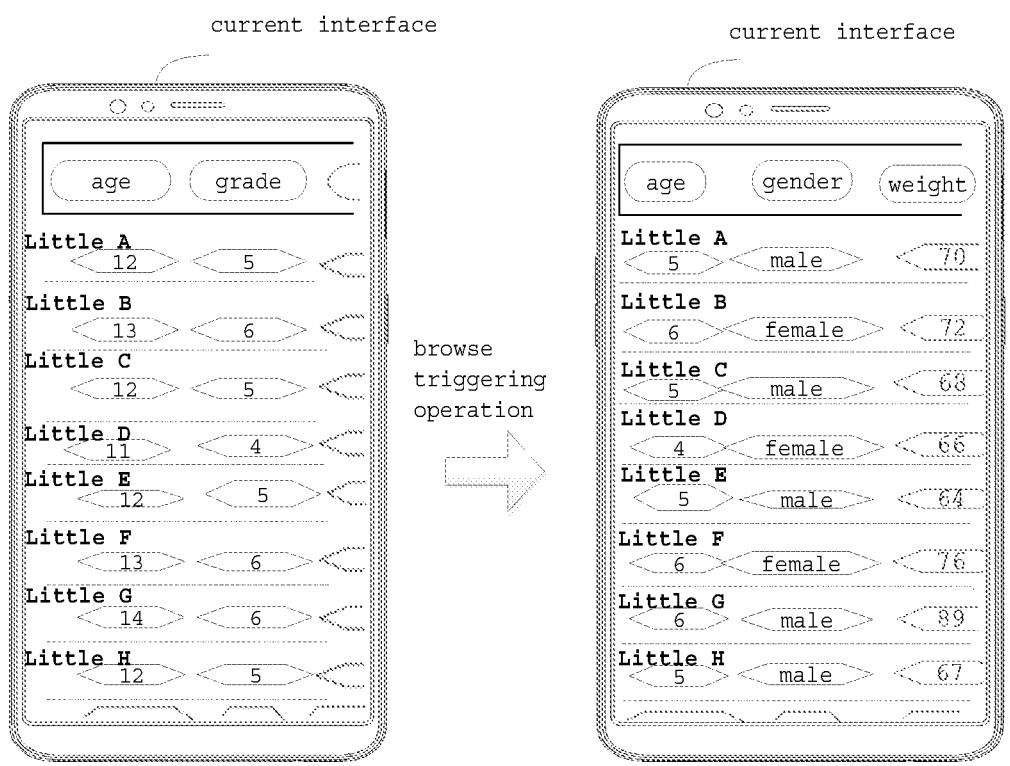
FIG. 6(a) is a schematic diagram of another current interface for table information displaying provided in some embodiments of the present disclosure.
Figure 6B:
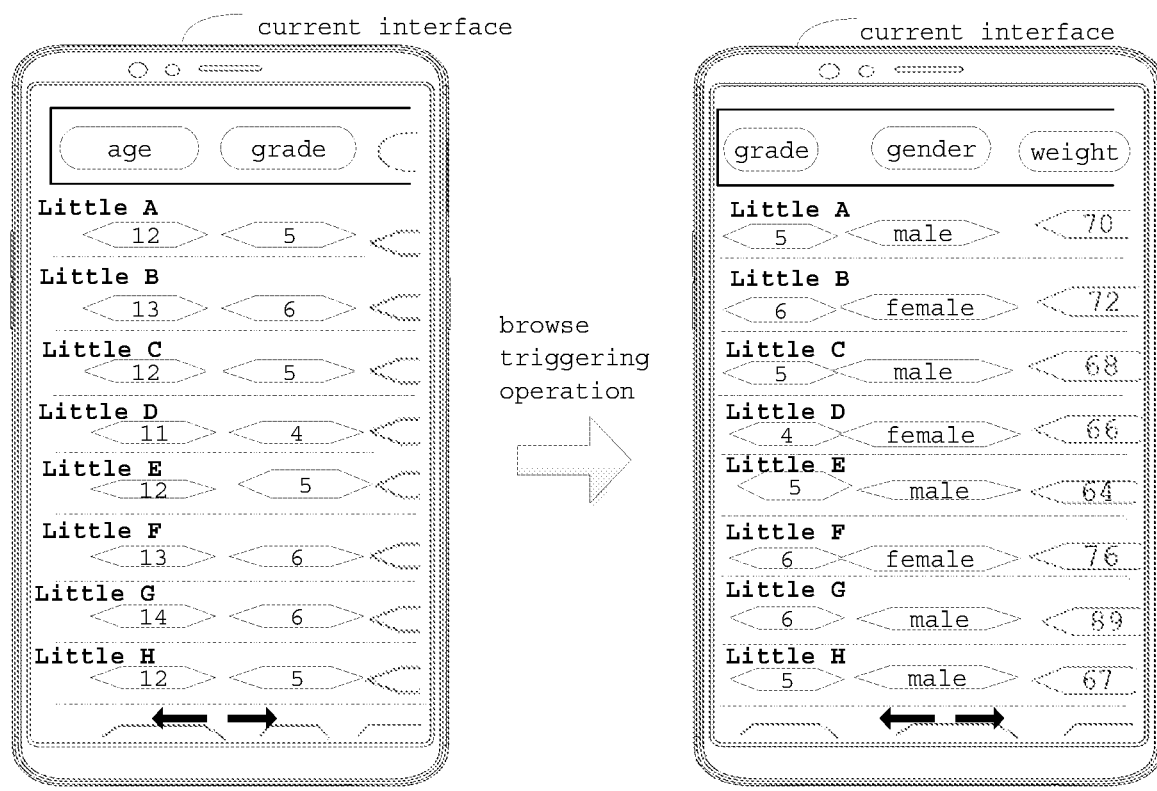
FIG. 6(b) is a schematic diagram of another current interface for table information displaying provided in some embodiments of the present disclosure.
Figure 6C:
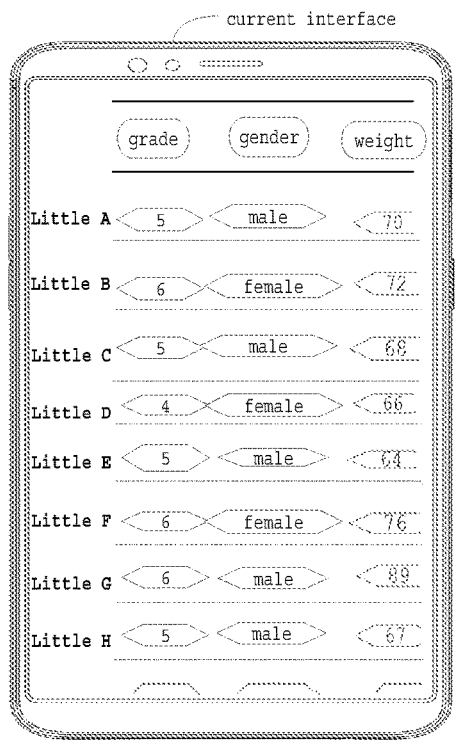
FIG. 6(c) is a schematic diagram of another current interface for table information displaying provided in some embodiments of the present disclosure.
Figure 6D:
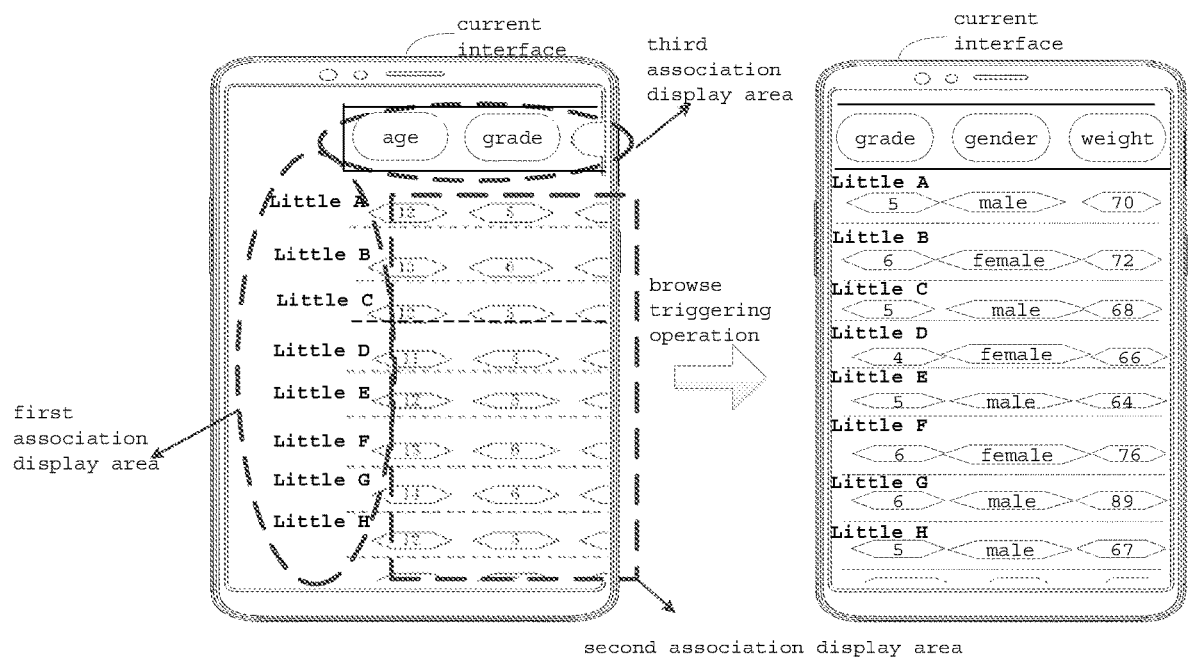
FIG. 6(d) is a schematic diagram of another current interface for table information displaying provided in some embodiments of the present disclosure.

Continually taking the scenario shown in FIG. 6(a) as an example, referring to FIG. 6 (d), the first index field is a "name" field, the second index field is other index fields such as "age", "grade", and "gender", and the third association area is an area where a first cell of a column where table information corresponding to the second index field is located is located, then in response to a browse triggering operation, while fixedly displaying the "name" index field, the second index field and the corresponding table information are displayed with linkage.

In summary, according to the table displaying method in the embodiments of the present disclosure, the table information is displayed adaptively according to the displaying mode, thereby further improving readability of the table information.

As mentioned in the above embodiments, switching may be made between the displaying modes, and when the displaying mode is switched, in order to improve smoothness of the switching, in the embodiments of the present disclosure, the display of the table is also adjusted. The description thereof will be made below by taking the switching between the first displaying mode and the second displaying mode as an example.

In some embodiments of the present disclosure, in response to switching from the first displaying mode to the second displaying mode, for example, a user triggers a switching control for switching from the first displaying mode to the second displaying mode, and the like, then a switching instruction for switching from the first displaying mode to the second displaying mode will be triggered, to change a data structure of the table and a displaying position of the field of the table, wherein the data structure includes, but is not limited to, one or more of position relations between rows or columns in the table, and the like.

In some embodiments of the present disclosure, in the switching to the second displaying mode, partial index fields in the first displaying mode are changed from original areas of the table to association areas in content rows of table information corresponding to remaining index fields to perform fixed display, so as to change the data structure of the table.

The partial index field in the table information may be the above first index field etc., or may be the first index field and partial second index field not displayed on the current interface, etc.; which index field the partial index field corresponds to may be set according to a scenario, which is not shown here. In addition, the association area in the content row of the table information may be the first association area in the above embodiment, or the like.

Figure 7A:
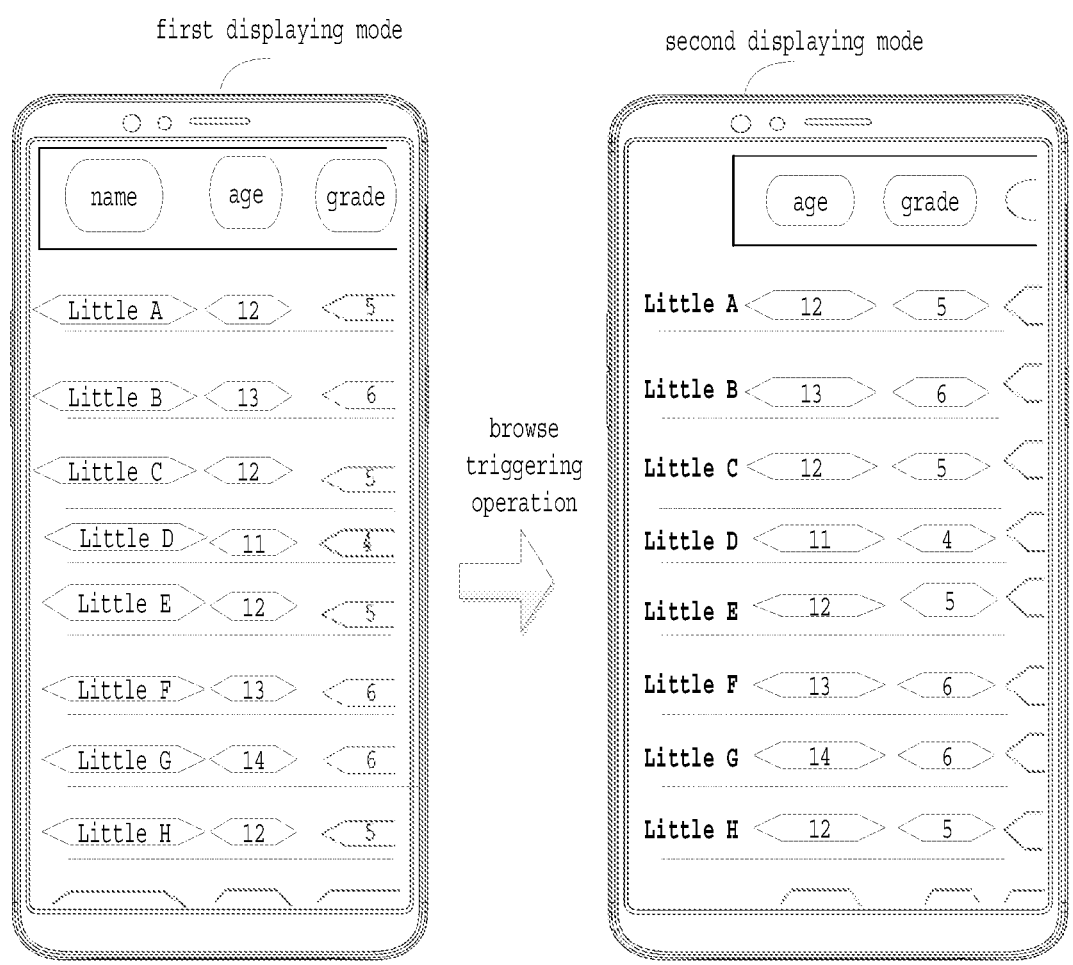
FIG. 7(a) is a schematic diagram of another current interface for table information displaying provided in some embodiments of the present disclosure.

Of course, the association area in the content row of the table information may also be a first cell area in the content row of the corresponding table information; for example, as shown in FIG. 7(a), when the partial index field is the "name" index field, then in the switching to the second displaying mode, the "name" index field in the first displaying mode is changed from an original area of the table to a first cell area in content rows of table information corresponding to remaining index fields, to perform fixed display, and at this point, positions of other index fields and corresponding table information are adaptively adjusted.

In some embodiments, in order to further improve smoothness of the switching, the displaying position of the field in the table may also be adaptively adjusted, that is, in the switching to the second displaying mode, row spacing between the content rows in the table is changed from a first distance corresponding to the first displaying mode to a second distance corresponding to the second displaying mode, wherein the first distance and the second distance may be calibrated by experimental data, or adapted according to a font size of the table information in the content row in the table.

Figure 7B:
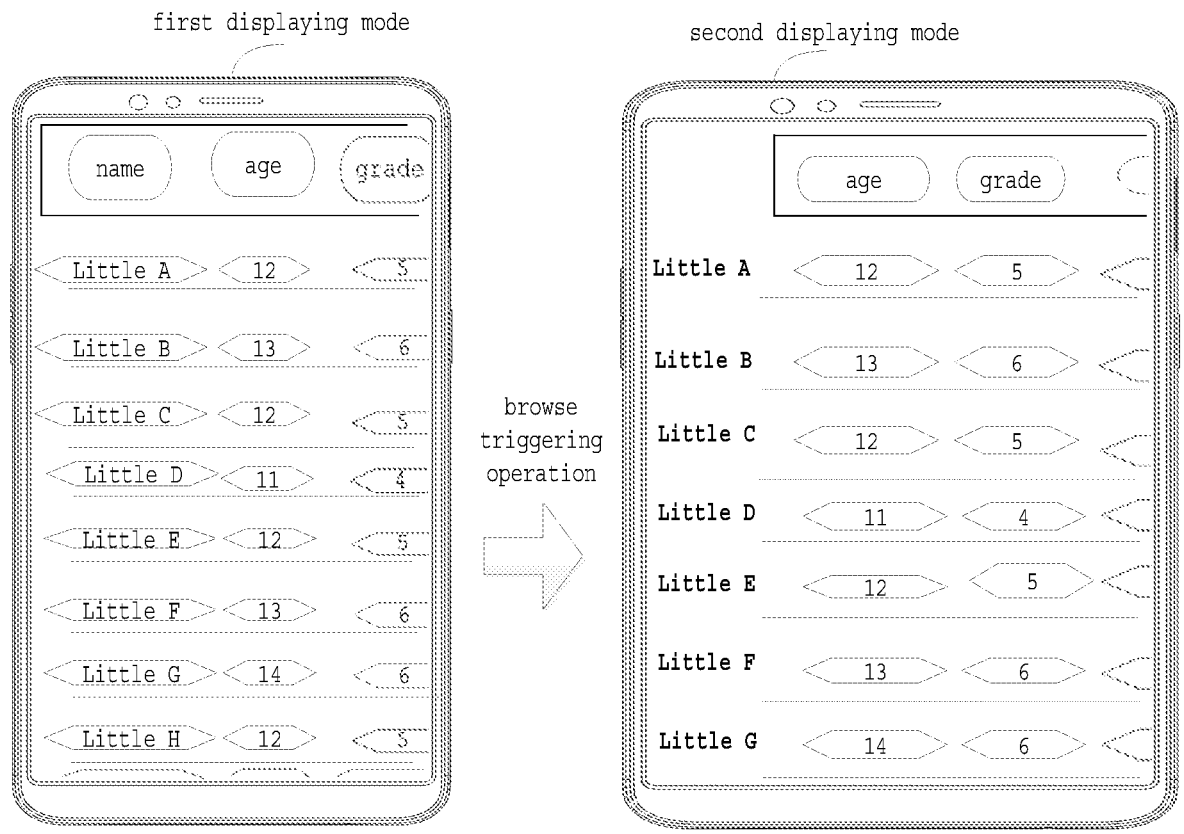
FIG. 7(b) is a schematic diagram of another current interface for table information displaying provided in some embodiments of the present disclosure.

Continually taking the scenario shown in FIG. 7(a) as an example, as shown in FIG. 7(b), in the switching to the second displaying mode, a row height etc. is adaptively adjusted in order to clearly display the index field and the corresponding table information.

Of course, in the above embodiment, the description is made only by taking the row spacing as an example, and in an actual application, a column width and the like may also be adjusted; an adjustment logic for the column width is the same as that for the row spacing, which will not be repeated here.

In summary, the table displaying method of the embodiment of the present disclosure is suitable for switching the displaying modes, and adjusting the data structure of the table and the displaying position, thereby improving switching smoothness of the displaying modes.

Compared with the related art, the technical solution provided in the embodiment of the present disclosure has the following advantages: the table displaying solution provided in the embodiment of the present disclosure determines the displaying mode of the table on the current interface, and then, in response to the browse triggering operation on the table, display the table information matched with the displaying size of the current interface according to the displaying mode. Therefore, the table content is displayed adaptively according to the displaying size and the displaying mode of the mobile terminal, so that readability of the table is improved, and convenience is provided for viewing the content in the table.

In order to implement the above embodiments, the present disclosure further provides a table displaying apparatus.

Figure 8:
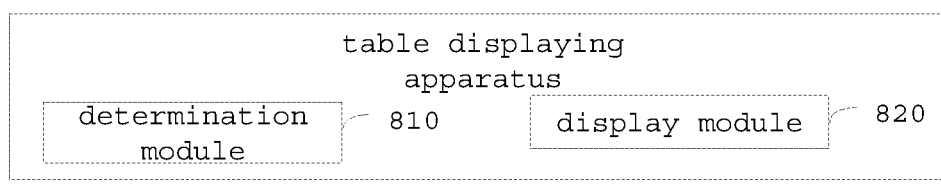
FIG. 8 is a schematic structural diagram of a table displaying apparatus provided in some embodiments of the present disclosure.

FIG. 8 is a schematic structural diagram of a table displaying apparatus provided in some embodiments of the present disclosure, wherein the apparatus may be implemented by software and/or hardware, and may be generally integrated in an electronic device. As shown in FIG. 8, the apparatus comprises: a determination module 810 and a display module 820, wherein the determination module 810 is configured to determine a displaying mode of a table on a current interface; and the display module 820 is configured to, in response to a browse triggering operation on the table, display table information matched with a displaying size of the current interface according to the displaying mode.

The table displaying apparatus provided in the embodiments of the present disclosure can execute the table displaying method provided in any embodiment of the present disclosure, and has corresponding function modules for executing the method and beneficial effects.

In order to implement the above embodiments, the present disclosure further provides a computer program product, comprising a computer program/instructions which, when executed by a processor, implements the table displaying method of the above embodiment.

Figure 9:
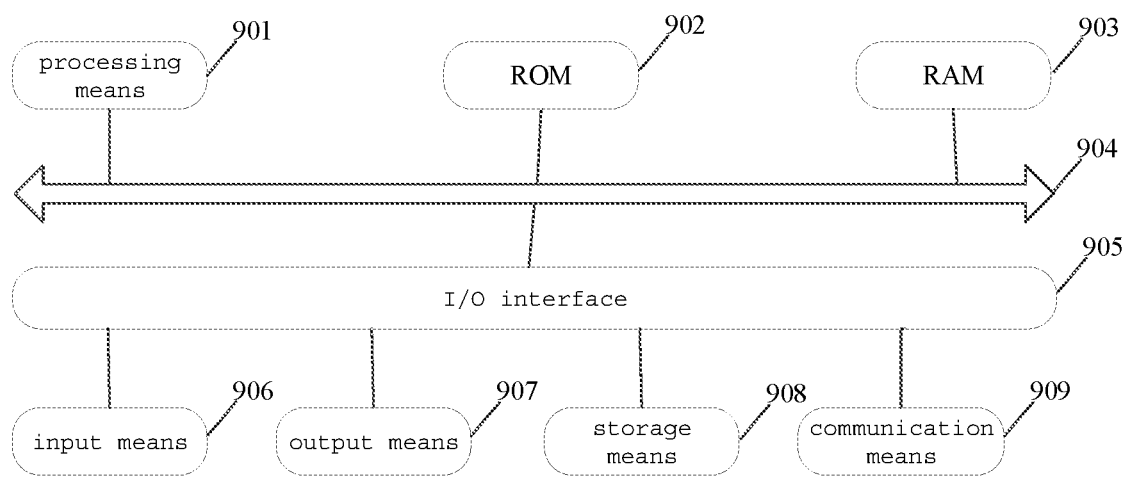
FIG. 9 is a schematic structural diagram of an electronic device provided in some embodiments of the present disclosure.

FIG. 9 is a schematic structural diagram of an electronic device provided in some embodiments of the present disclosure.

Reference is specifically made below to FIG. 9, which shows a schematic structural diagram of an electronic device 900 suitable for implementing the embodiment of the present disclosure. The electronic device 900 in the embodiment of the present disclosure may include, but is not limited to, mobile terminals such as a mobile phone, a notebook computer, a digital broadcast receiver, a PDA (Personal Digital Assistant), a PAD (tablet computer), a PMP (Portable Multimedia Player), and a vehicle-mounted terminal (e.g., a vehicle-mounted navigation terminal), and fixed terminals such as a digital TV, and a desktop computer. The electronic device shown in FIG. 9 is only one example, and should not bring any limitation to the functions and the use range of the embodiment of the present disclosure.

As shown in FIG. 9, the electronic device 900 may comprise a processing means (e.g., a central processing unit, a graphics processing unit, etc.) 901, which may perform various appropriate actions and processes according to a program stored in a read-only memory (ROM) 902 or a program loaded from a storage means 908 into a random access memory (RAM) 903. In the RAM 903, various programs and data necessary for the operations on the electronic device 900 are also stored. The processing means 901, ROM 902, and RAM 903 are connected with each other via a bus 904. An input/output (I/O) interface 905 is also connected to the bus 904.

Generally, the following means may be connected to the I/O interface 905: an input means 906 including, for example, a touch screen, touch pad, keyboard, mouse, camera, microphone, accelerometer, gyroscope, etc.; an output means 907 including, for example, a liquid crystal display (LCD), speaker, vibrator, etc.; the storage means 908 including, for example, a magnetic tape, hard disk, etc.; and a communication means 909. The communication means 909 may allow the electronic device 900 to communicate with another device wirelessly or by wire to exchange data. While FIG. 9 illustrates the electronic device 900 having the various means, it should be understood that not all illustrated means are required to be implemented or provided. More or fewer means may be alternatively implemented or provided.

In particular, according to the embodiment of the present disclosure, the processes described above with reference to the flow diagrams may be implemented as a computer software program. For example, the embodiment of the present disclosure comprises a computer program product, the computer program product comprising a computer program carried on a non-transitory computer-readable medium, the computer program containing program code for performing the method illustrated by the flow diagrams. In such embodiments, the computer program may be downloaded and installed from a network via the communications means 909, or installed from the storage means 908, or installed from the ROM 902. When executed by the processing means 901, the computer program performs the above functions defined in the table displaying method of the embodiments of the present disclosure.

It should be noted that the non-transitory computer-readable medium of the present disclosure may be a computer-readable signal medium or a computer-readable storage medium or any combination of the above two. The computer-readable storage medium may be, for example, but not limited to, an electronic, magnetic, optical, electromagnetic, infrared, or semiconductor system, apparatus, or device, or any combination of the foregoing. More specific examples of the computer-readable storage medium may comprise, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium that can contain, or store a program for use by or in conjunction with an instruction execution system, apparatus, or device. In contrast, in the present disclosure, the computer-readable signal medium may comprise a data signal propagated in baseband or as part of a carrier wave, in which computer-readable program code is carried. Such a propagated data signal may take a variety of forms, including, but not limited to, an electromagnetic signal, optical signal, or any suitable combination of the forgoing. The computer-readable signal medium may be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, including but not limited to: a wire, an optical cable, RF (Radio Frequency), etc., or any suitable combination of the foregoing.

In some embodiments, a client and a server may communicate using any currently known or future developed network protocol, such as HTTP, and may be interconnected with any form or medium of digital data communication (e.g., a communication network). Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium may be embodied in the above electronic device; or may be exist separately without being assembled into the electronic device.

The above computer-readable medium has one or more programs carried thereon, wherein the above one or more programs, when executed by the electronic device, cause the electronic device to:

determining a displaying mode of a table on a current interface, and then, in response to a browse triggering operation on the table, displaying table information matched with a displaying size of the current interface according to the displaying mode. Therefore, the table content is presented adaptively according to the displaying size and the displaying mode of the mobile terminal, so that readability of the table is improved, and convenience is provided to the viewing of the content in the table.

Computer program code for performing the operations of the present disclosure may be written in one or more programming languages, which include but are not limited to an object-oriented programming language such as Java, Smalltalk, C++, and include a conventional procedural programming language, such as the "C" language or similar programming languages. The program code may be executed entirely on a user's computer, partly on the user's computer, as a stand-alone software package, partly on the user's computer and partly on a remote computer, or entirely on the remote computer or server. In a scenario where the remote computer is involved, the remote computer may be connected to the user's computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent one module, program segment, or portion of code, which comprises one or more executable instructions for implementing a specified logical function. It should also be noted that, in some alternative implementations, functions noted in blocks may occur in an order different from that noted in the drawings. For example, two blocks shown in succession may, in fact, be executed substantially concurrently, or the blocks may sometimes be executed in a reverse order, which depends upon the functions involved. It will also be noted that each block of the block diagrams and/or flow diagrams, and a combination of the blocks in the block diagrams and/or flow diagrams, can be implemented by a special-purpose hardware-based system that performs specified functions or operations, or by a combination of special-purpose hardware and computer instructions.

The involved unit described in the embodiments of the present disclosure may be implemented by software or hardware. The name of the unit does not, in some cases, constitute a limitation on the unit itself.

The functions described above herein may be executed, at least partially, by one or more hardware logic components. For example, without limitation, exemplary types of the hardware logic component that may be used include: a field programmable gate array (FPGA), application specific integrated circuit (ASIC), application specific standard product (ASSP), system on chip (SOC), complex programmable logic device (CPLD), and the like.

In the context of this disclosure, a machine-readable medium may be a tangible medium, which can contain, or store a program for use by or in conjunction with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of the foregoing. More specific examples of the machine-readable storage medium include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, there is provided a table displaying method, comprising: determining a displaying mode of a table on a current interface; and in response to a browse triggering operation on the table, displaying table information matched with a displaying size of the current interface according to the displaying mode.

According to one or more embodiments of the present disclosure, in the table displaying method provided in the present disclosure, the determining a displaying mode of a table on the current interface comprises:
  receiving a displaying mode set by system default, or
  receiving a displaying mode selected by a user from a candidate displaying mode list, or
  in response to a switching operation on a current displaying mode, determining a displaying mode after the switching.

According to one or more embodiments of the present disclosure, in the table displaying method provided in the present disclosure, the displaying table information matched with a displaying size of the current interface according to the displaying mode comprises:
  displaying table information matched with a landscape-screen viewing size of the current interface according to the displaying mode, or
  displaying table information matched with a portrait-screen viewing size of the current interface according to the displaying mode.

According to one or more embodiments of the present disclosure, in the table displaying method provided in the present disclosure, the in response to a browse triggering operation on the table, displaying table information matched with a displaying size of the current interface according to the displaying mode, comprises:
  when the displaying mode is a first displaying mode, in response to a swipe browse operation on the table, in association with a swipe direction of the swipe browse operation, continuously displaying the table information matched with the displaying size on the current interface in a sliding manner.

According to one or more embodiments of the present disclosure, in the table displaying method provided in the present disclosure, the swipe browse operation comprises:
  a leftward/rightward swipe browse operation, or an upward/downward swipe browse operation.

According to one or more embodiments of the present disclosure, in the table displaying method provided in the present disclosure, the in response to a browse triggering operation on the table, displaying table information matched with a displaying size of the current interface according to the displaying mode, comprises:
  when the displaying mode is a first displaying mode, in response to a triggering operation on a browse control for the table, in association with a forward/backward page-turning direction of the triggering operation, continuously displaying the table information matched with the displaying size on the current interface in a sliding manner.

According to one or more embodiments of the present disclosure, in the table displaying method provided in the present disclosure, the in response to a browse triggering operation on the table, displaying table information matched with a displaying size of the current interface according to the displaying mode, comprises:
  when the displaying mode is a second displaying mode, in response to a swipe browse operation on the table, continuously display an index field in the table on a first association area of the current interface; and in association with a swipe direction of the swipe browse operation, continuously displaying table information matched with the displaying size and corresponding to the index field on a second association area of the current interface in a sliding manner.

According to one or more embodiments of the present disclosure, in the table displaying method provided in the present disclosure, the, in response to a browse triggering operation on the table, displaying table information matched with a displaying size of the current interface according to the displaying mode, comprises:
  when the displaying mode is a second displaying mode, in response to a triggering operation on a browse control for the table, continuously displaying an index field in the table on a first association area of the current interface; and in association with a forward/backward page-turning direction of the triggering operation, on a second association area of the current interface to continuously display table information matched with the displaying size and corresponding to the index field in a page-turning manner.

According to one or more embodiments of the present disclosure, in the table displaying method provided in the present disclosure, the continuously displaying an index field in the table on a first association area of the current interface, comprises:
  continuously displaying the index field fixedly on the first association area; or continuously displaying the index field flickeringly on the first association area.

According to one or more embodiments of the present disclosure, in the table displaying method provided in the present disclosure, matched information displayed on the first association area and the second association area is displayed in a manner of up-and-down adjacency; or matched information displayed on the first association area and the second association area is displayed in a manner of left-and-right adjacency.

According to one or more embodiments of the present disclosure, the table displaying method provided in the present disclosure further comprises:
  zooming-in the information displayed on the first association area and the second association area in a form of card.

According to one or more embodiments of the present disclosure, there is provided a table displaying apparatus, comprising: a determination module configured to determine a displaying mode of a table on a current interface; and a display module configured to, in response to a browse triggering operation on the table, display table information matched with a displaying size of the current interface according to the displaying mode.

According to one or more embodiments of the present disclosure, in the table displaying apparatus provided in the present disclosure, the determination module is specifically configured to:
  receive a displaying mode set by system default, or receive a displaying mode selected by a user from a candidate displaying mode list, or in response to a switching operation on a current displaying mode, determine a displaying mode after the switching.

According to one or more embodiments of the present disclosure, in the table displaying apparatus provided in the present disclosure, the display module is specifically configured to:
  display table information matched with a landscape-screen viewing size of the current interface according to the displaying mode, or display table information matched with a portrait-screen viewing size of the current interface according to the displaying mode.

According to one or more embodiments of the present disclosure, in the table displaying apparatus provided in the present disclosure, the display module is specifically configured to:
  when the displaying mode is a first displaying mode, in response to a swipe browse operation on the table, in association with a swipe direction of the swipe browse operation, perform swipe on the current interface to continuously display the table information matched with the displaying size.

According to one or more embodiments of the present disclosure, in the table displaying apparatus provided in the present disclosure, the swipe browse operation comprises:
  a leftward/rightward swipe browse operation, or an upward/downward swipe browse operation.

According to one or more embodiments of the present disclosure, in the table displaying apparatus provided in the present disclosure, the display module is specifically configured to: when the displaying mode is a first displaying mode, in response to a triggering operation on a browse control for the table, in association with a forward/backward page-turning direction of the triggering operation, perform page-turning on the current interface to continuously display the table information matched with the displaying size.

According to one or more embodiments of the present disclosure, in the table displaying apparatus provided in the present disclosure, the display module is specifically configured to:
  when the displaying mode is a second displaying mode, in response to a swipe browse operation on the table, continuously display an index field in the table on a first association area of the current interface; and in association with a swipe direction of the swipe browse operation, perform swipe on a second association area of the current interface to continuously display table information matched with the displaying size and corresponding to the index field.

According to one or more embodiments of the present disclosure, in the table displaying apparatus provided in the present disclosure, the index field of the table comprises: a first index field and a second index field, and the display module is further configured to:
  display the first index field on the first association area; and
  in association with the browse triggering operation on the table, changingly display a second index field matched with the displaying size on a third association area of the current interface, while changingly display table information corresponding to the first index field and the second index field on the second association area, in linkage with the third association area.

According to one or more embodiments of the present disclosure, in the table displaying apparatus provided in the present disclosure, the display module comprises:
  a displaying unit configured to, when the displaying mode is a second displaying mode, in response to a triggering operation on a browse control for the table, continuously display the index field in the table on the first association area of the current interface; and a display unit configured to, in association with a forward/backward page-turning direction of the triggering operation, perform page-turning on the second association area of the current interface to continuously display table information matched with the displaying size and corresponding to the index field.

According to one or more embodiments of the present disclosure, in the table displaying apparatus provided in the present disclosure, the display unit is specifically configured to:

continuously display the index field fixedly on the first association area; or continuously display the index field flickeringly on the first association area.

According to one or more embodiments of the present disclosure, in the table displaying apparatus provided in the present disclosure, matched information displayed on the first association area and the second association area is displayed in a manner of up-and-down adjacency; or matched information displayed by the first association area and the second association area is displayed in a manner of left-and-right adjacency.

According to one or more embodiments of the present disclosure, in the table displaying apparatus provided in the present disclosure, the display module is further configured to: zoom in the information displayed on the first association area and the second association area in a form of card.

According to one or more embodiments of the present disclosure, in the table displaying apparatus provided in the present disclosure, the display module is further configured to: in response to switching from the first displaying mode to the second displaying mode, change a data structure of the table and a displaying position of the field of the table.

According to one or more embodiments of the present disclosure, in the table displaying apparatus provided in the present disclosure, the display module is specifically configured to: in the switching to the second displaying mode, change partial index fields in the first displaying mode from original areas in the table to association areas in content rows of table information corresponding to remaining index fields, to perform fixed display.

According to one or more embodiments of the present disclosure, in the table displaying apparatus provided in the present disclosure, the display module is specifically configured to: in the switching to the second displaying mode, change row spacing of content rows in the table from a first distance corresponding to the first displaying mode to a second distance corresponding to the second displaying mode.

The modules or units described above may be implemented as software components executed on one or more general-purpose processors, or as hardware performing certain functions or a combination thereof, such as programmable logic devices and/or application specific integrated circuits. In some embodiments, these modules or units may be embodied in a form of a software product, which may be stored in non-volatile storage media, these non-volatile storage media including instructions that cause a computer device (e.g., a personal computer, server, network device, mobile terminal, etc.) to implement the method described in the embodiments of the present disclosure. In other embodiments, the above modules or units may be implemented on a single device, or may be distributed over a plurality of devices. The functions of these modules or units may be combined with each other or further divided into a plurality of sub-units.

According to one or more embodiments of the present disclosure, there is provided an electronic device, comprising:

a processor; and a memory configured to store executable instructions for the processor, the processor being configured to read the executable instructions from the memory and execute the instructions to implement any of the table displaying methods provided in the present disclosure.

According to one or more embodiments of the present disclosure, there is provided a computer-readable storage medium having a computer program stored thereon, the computer program being used for performing any of the table displaying methods provided in the present disclosure.

Some embodiments of the present disclosure further provide a computer program, comprising: instructions which, when executed by a processor, cause the processor to perform the table displaying method according to the embodiments of the present disclosure.

Some embodiments of the present disclosure further provide a computer program product, comprising instructions which, when executed by a processor, cause the processor to perform the table displaying method according to the embodiments of the present disclosure.

The foregoing description is only an illustration of the preferred embodiments of the present disclosure and the technical principles employed. It should be appreciated by those skilled in the art that the disclosure scope involved in the present disclosure is not limited to the technical solutions formed by specific combinations of the technical features described above, but also encompasses other technical solutions formed by arbitrary combinations of the above technical features or equivalent features thereof without departing from the above disclosed concepts. For example, a technical solution formed by performing mutual replacement between the above features and technical features having similar functions to those disclosed (but not limited to) in the present disclosure.

Furthermore, while operations are depicted in a specific order, this should not be understood as requiring that these operations be performed in the specific order shown or in a sequential order. Under certain circumstances, multitasking and parallel processing might be advantageous. Similarly, while several specific implementation details are included in the above discussion, these should not be construed as limitations on the scope of the present disclosure. Certain features that are described in the context of separate embodiments may also be implemented in combination in a single embodiment. Conversely, various features that are described in the context of a single embodiment may also be implemented separately or in any suitable sub-combination in multiple embodiments.

Although the subject matter has been described in language specific to structural features and/or method logical actions, it should be understood that the subject matter defined in the attached claims is not necessarily limited to the specific features or actions described above. Rather, the specific features and actions described above are only example forms of implementing the claims.

What is claimed is:

1. A table displaying method, comprising:

determining a displaying mode of a table on a current interface;

in response to a browse triggering operation on the table, displaying table information matched with a displaying size of the current interface according to the displaying mode; and in response to switching from a first displaying mode to a second displaying mode, changing a data structure of the table, comprising changing partial index fields in the first displaying mode from original areas in the table to association areas in content rows of table information corresponding to remaining index fields, to perform fixed display, and hiding index information corresponding to the partial index fields in a first row.

2. The table displaying method according to claim 1, wherein the determining the displaying mode of the table on the current interface comprises:

receiving a displaying mode set by system default, or receiving a displaying mode selected by a user from a candidate displaying mode list, or in response to a switching operation on a current displaying mode, determining a displaying mode after the switching.

3. The table displaying method according to claim 1, wherein the displaying table information matched with the displaying size of the current interface according to the displaying mode comprises:

displaying table information matched with a landscape-screen viewing size of the current interface according to the displaying mode, or displaying table information matched with a portrait-screen viewing size of the current interface according to the displaying mode.

4. The table displaying method according to claim 1, wherein in response to the browse triggering operation on the table, the displaying table information matched with the displaying size of the current interface according to the displaying mode, comprises:

in case that the displaying mode is a first displaying mode, in response to a swipe browse operation on the table, in association with a swipe direction of the swipe browse operation, continuously displaying the table information matched with the displaying size on the current interface in a sliding manner.

5. The table displaying method according to claim 4, wherein the swipe browse operation comprises:

a leftward/rightward swipe browse operation, or an upward/downward swipe browse operation.

6. The table displaying method according to claim 1, wherein in response to the browse triggering operation on the table, the displaying table information matched with the displaying size of the current interface according to the displaying mode, comprises:

in case that the displaying mode is a first displaying mode, in response to a triggering operation on a browse control for the table, in association with a forward/backward page-turning direction of the triggering operation, continuously displaying the table information matched with the displaying size on the current interface in a page-turning manner.

7. The table displaying method according to claim 1, wherein in response to the browse triggering operation on the table, the displaying table information matched with the displaying size of the current interface according to the displaying mode, comprises:

in case that the displaying mode is a second displaying mode, in response to a swipe browse operation on the table, continuously displaying an index field in the table on a first association area of the current interface; and in association with a swipe direction of the swipe browse operation, continuously displaying table information matched with the displaying size and corresponding to the index field on a second association area of the current interface in a sliding manner.

8. The table displaying method according to claim 7, wherein the index field of the table comprises a first index field and a second index field, and the table displaying method further comprises:

displaying the first index field on the first association area; and in association with the browse triggering operation on the table, changingly displaying a second index field matched with the displaying size on a third association area of the current interface, while changingly displaying table information corresponding to the first index field and the second index field on the second association area, in linkage with the third association area.

9. The table displaying method according to claim 7 wherein the continuously displaying an index field in the table on the first association area of the current interface, comprises:

continuously displaying the index field fixedly on the first association area; or continuously displaying the index field flickeringly on the first association area.

10. The table displaying method according to claim 7, further comprising:

displaying matched information displayed on the first association area and the second association area in a manner of up-and-down adjacency; or displaying matched information displayed on the first association area and the second association area in a manner of left-and-right adjacency.

11. The table displaying method according to claim 7, further comprising:

zooming in information displayed on the first association area and the second association area in a form of a card.

12. The table displaying method according to claim 1, wherein in response to the browse triggering operation on the table, the displaying table information matched with the displaying size of the current interface according to the displaying mode, comprises:

in case that the displaying mode is a second displaying mode, in response to a triggering operation on a browse control for the table, continuously displaying an index field in the table on a first association area of the current interface; and in association with a forward/backward page-turning direction of the triggering operation, continuously displaying table information matched with the displaying size and corresponding to the index field on a second association area of the current interface in a page-turning manner.

13. The table displaying method according to claim 1, further comprising:

in response to switching from the first displaying mode to the second displaying mode, changing a displaying position of a field of the table.

14. The table displaying method according to claim 13, wherein the changing the displaying position of the field, further comprises:

in the switching to the second displaying mode, changing row spacing between the content rows in the table from a first distance corresponding to the first displaying mode to a second distance corresponding to the second displaying mode.

15. An electronic device, comprising:

a processor; and a memory configured to store executable instructions for the processor, the processor being configured to read the executable instructions from the memory and execute the instructions to implement a table displaying method comprising:

determining a displaying mode of a table on a current interface;

in response to a browse triggering operation on the table, displaying table information matched with a displaying size of the current interface according to the displaying mode; and in response to switching from a first displaying mode to a second displaying mode, changing a data structure of the table, comprising changing partial index fields in the first displaying mode from original areas in the table to association areas in content rows of table information corresponding to remaining index fields, to perform fixed display, and hiding index information corresponding to the partial index fields in a first row.

16. The electronic device according to claim 15, wherein the table displaying method further comprises: receiving a displaying mode set by system default, or receiving a displaying mode selected by a user from a candidate displaying mode list, or in response to a switching operation on a current displaying mode, determining a displaying mode after the switching.

17. A non-transitory computer-readable storage medium having a computer program stored thereon, the computer program being used for performing a table displaying method comprising:

determining a displaying mode of a table on a current interface;

in response to a browse triggering operation on the table, displaying table information matched with a displaying size of the current interface according to the displaying mode; and in response to switching from a first displaying mode to a second displaying mode, changing a data structure of the table, comprising changing partial index fields in the first displaying mode from original areas in the table to association areas in content rows of table information corresponding to remaining index fields, to perform fixed display, and hiding index information corresponding to the partial index fields in a first row.

18. The non-transitory computer-readable storage medium according to claim 17, wherein the table displaying method further comprises:

receiving a displaying mode set by system default, or receiving a displaying mode selected by a user from a candidate displaying mode list, or in response to a switching operation on a current displaying mode, determining a displaying mode after the switching.

19. The non-transitory computer-readable storage medium according to claim 17, wherein the table displaying method further comprises:

displaying table information matched with a landscape-screen viewing size of the current interface according to the displaying mode, or displaying table information matched with a portrait-screen viewing size of the current interface according to the displaying mode.

* * * * *